(12) United States Patent
Dhandapani et al.

(10) Patent No.: US 11,836,913 B2
(45) Date of Patent: Dec. 5, 2023

(54) FILM THICKNESS ESTIMATION FROM MACHINE LEARNING BASED PROCESSING OF SUBSTRATE IMAGES

(71) Applicant: Applied Materials, Inc., Santa Clara, CA (US)

(72) Inventors: Sivakumar Dhandapani, San Jose, CA (US); Arash Alahgholipouromrani, San Jose, CA (US); Dominic J. Benvegnu, La Honda, CA (US); Jun Qian, Sunnyvale, CA (US); Kiran Lall Shrestha, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 342 days.

(21) Appl. No.: 17/359,307

(22) Filed: Jun. 25, 2021

(65) Prior Publication Data

US 2021/0407065 A1    Dec. 30, 2021

Related U.S. Application Data

(60) Provisional application No. 63/045,782, filed on Jun. 29, 2020.

(51) Int. Cl.
*G06K 9/00* (2022.01)
*G06T 7/00* (2017.01)
(Continued)

(52) U.S. Cl.
CPC .......... *G06T 7/001* (2013.01); *B24B 37/013* (2013.01); *G06T 7/60* (2013.01);
(Continued)

(58) Field of Classification Search
CPC . G06T 7/001; G06T 7/60; G06T 2207/10024; G06T 2207/20021;
(Continued)

(56) References Cited

U.S. PATENT DOCUMENTS

| 5,897,378 A | 4/1999 | Eriguchi |
| 6,603,874 B1 | 8/2003 | Stern et al. |

(Continued)

FOREIGN PATENT DOCUMENTS

| CN | 108966674 | 12/2018 |
| JP | 2000-233369 | 8/2000 |

(Continued)

OTHER PUBLICATIONS

International Search Report and Written Opinion in International Appln. No. PCT/US2021/0339247, dated Oct. 6, 2021, 11 pages.

(Continued)

*Primary Examiner* — Samir A Ahmed
(74) *Attorney, Agent, or Firm* — Fish & Richardson P.C.

(57) ABSTRACT

A neural network is trained for use in a substrate thickness measurement system by obtaining ground truth thickness measurements of a top layer of a calibration substrate at a plurality of locations, each location at a defined position for a die being fabricated on the substrate. A plurality of color images of the calibration substrate are obtained, each color image corresponding to a region for a die being fabricated on the substrate. A neural network is trained to convert color images of die regions from an in-line substrate imager to thickness measurements for the top layer in the die region. The training is performed using training data that includes the plurality of color images and ground truth thickness measurements with each respective color image paired with a ground truth thickness measurement for the die region associated with the respective color image.

20 Claims, 5 Drawing Sheets

(51) Int. Cl.
*G06T 7/60* (2017.01)
*B24B 37/013* (2012.01)

(52) U.S. Cl.
CPC ............... *G06T 2207/10024* (2013.01); *G06T 2207/20021* (2013.01); *G06T 2207/20081* (2013.01); *G06T 2207/20084* (2013.01); *G06T 2207/30148* (2013.01)

(58) Field of Classification Search
CPC . G06T 2207/20081; G06T 2207/20084; G06T 2207/30148; G06T 7/62; G06T 7/0004; B24B 37/013; G06N 20/00
See application file for complete search history.

(56) References Cited

U.S. PATENT DOCUMENTS

| | | | |
|---|---|---|---|
| 6,712,927 | B1 | 3/2004 | Grimbergen et al. |
| 6,959,255 | B2 | 10/2005 | Ye et al. |
| 7,001,243 | B1 | 2/2006 | Yi et al. |
| 7,076,320 | B1 | 7/2006 | Phan et al. |
| 9,816,810 | B2 | 11/2017 | Shchegrov et al. |
| 10,012,494 | B2 | 7/2018 | David et al. |
| 10,030,971 | B2 | 7/2018 | Bozdog et al. |
| 2002/0013058 | A1 | 1/2002 | Tang |
| 2004/0259472 | A1 | 12/2004 | Chalmers et al. |
| 2005/0054268 | A1 | 3/2005 | Kistler et al. |
| 2005/0287929 | A1 | 12/2005 | Swedek et al. |
| 2006/0009128 | A1 | 1/2006 | Hanawa et al. |
| 2006/0025048 | A1 | 2/2006 | Billig |
| 2006/0025052 | A1 | 2/2006 | Birang et al. |
| 2006/0048697 | A1 | 3/2006 | Houge et al. |
| 2006/0063469 | A1 | 3/2006 | Talich et al. |
| 2007/0042675 | A1 | 2/2007 | Benvegnu et al. |
| 2007/0077671 | A1 | 4/2007 | David et al. |
| 2007/0224915 | A1 | 9/2007 | David et al. |
| 2008/0031510 | A1 | 2/2008 | Jung |
| 2014/0024291 | A1 | 1/2014 | Zhang et al. |
| 2014/0206259 | A1 | 7/2014 | Benvegnu et al. |
| 2017/0140525 | A1 | 5/2017 | Benvegnu et al. |
| 2017/0177997 | A1 | 6/2017 | Karlinsky et al. |
| 2018/0061032 | A1 | 3/2018 | Benvegnu |
| 2018/0107928 | A1 | 4/2018 | Zhang et al. |
| 2018/0150052 | A1 | 5/2018 | Cherian |
| 2019/0072482 | A1 | 3/2019 | Feng et al. |
| 2020/0005140 | A1 | 1/2020 | Cherian et al. |
| 2020/0094370 | A1 | 3/2020 | Cherian et al. |
| 2021/0407066 | A1* | 12/2021 | Dhandapani ............... G06T 7/62 |

FOREIGN PATENT DOCUMENTS

| | | |
|---|---|---|
| JP | 2001-287159 | 10/2001 |
| JP | 2007-266235 | 10/2007 |
| JP | 2010-067918 | 3/2010 |
| TW | 201940833 | 10/2019 |
| WO | WO 2007/024807 | 3/2007 |

OTHER PUBLICATIONS

Office Action in Taiwanese Appln. No. 110123728, dated May 2, 2022, 11 pages (with English Summary).

McNeil, "Scatterometry Applied to Microelectronics Processing," presented at LEOS Summer Topical Meetings, Aventura, FL, Jul. 24-28, 2000; IEEE, Aug. 2002, pp. 37-38.

* cited by examiner

FILM THICKNESS ESTIMATION FROM MACHINE LEARNING BASED PROCESSING OF SUBSTRATE IMAGES

CROSS-REFERENCE TO RELATED APPLICATIONS

This application claims priority to U.S. Application Ser. No. 63/045,782, filed on Jun. 29, 2020, the disclosure of which is incorporated by reference.

TECHNICAL FIELD

This disclosure relates to optical metrology, e.g., to detect the thickness of a layer on a substrate using a machine learning approach.

BACKGROUND

An integrated circuit is typically formed on a substrate by the sequential deposition of conductive, semiconductive, or insulative layers on a silicon wafer. Planarization of a substrate surface may be required for the removal of a filler layer or to improve planarity for photolithography during fabrication of the integrated circuit.

Chemical mechanical polishing (CMP) is one accepted method of planarization. This planarization method typically requires that the substrate be mounted on a carrier or polishing head. The exposed surface of the substrate is typically placed against a rotating polishing pad. The carrier head provides a controllable load on the substrate to push it against the polishing pad. An abrasive polishing slurry is typically supplied to the surface of the polishing pad.

Various optical metrology systems, e.g., spectrographic or ellipsometric, can be used to measure the thickness of the substrate layer pre-polishing and post-polishing, e.g., at an in-line or stand-alone metrology station.

As a parallel issue, advancements in hardware resources such as Graphical Processing Units (GPU) and Tensor Processing Units (TPU) have resulted in a vast improvement in the deep learning algorithms and their applications. One of the evolving fields of deep learning is computer vision and image recognition. Such computer vision algorithms are mostly designed for image classification or segmentation.

SUMMARY

In one aspect, a method of training a neural network for use in a substrate thickness measurement system includes obtaining ground truth thickness measurements of a top layer of a calibration substrate at a plurality of locations, each location at a defined position for a die being fabricated on the substrate. A plurality of color images of the calibration substrate are obtained, each color image corresponding to a region for a die being fabricated on the substrate. A neural network is trained to convert color images of die regions from an in-line substrate imager to thickness measurements for the top layer in the die region. The training is performed using training data that includes the plurality of color images and ground truth thickness measurements with each respective color image paired with a ground truth thickness measurement for the die region associated with the respective color image.

In another aspect, a method of controlling polishing includes obtaining a first color image of a first substrate at an in-line monitoring station of a polishing system, dividing the first color image into a plurality of second color images using a die mask such that each second color image corresponds to a region for a die being fabricated on the first substrate, generating thickness measurements for one or more locations, and determining a polishing parameter for the first substrate or a subsequent second substrate based on the thickness measurements. Each respective location of the one more locations corresponding to a respective region for a die being fabricated on the first substrate. To generate the thickness measurements for a region, a second color image corresponding to the region is processed through a neural network that was trained using training data that included a plurality of third color images of dies of a calibration substrate and ground truth thickness measurements of the calibration substrate, with each respective third color image paired with a ground truth thickness measurement for a die region associated with the respective third color image.

Implementations can include one or more of the following potential advantages. Thicknesses for multiple dies on a substrate may be measured quickly. For example, an in-line metrology system may determine thicknesses for a substrate based on a color images of the substrate without impacting throughput. The estimated thickness may be directly used in a multivariable run-to-run control scheme.

The described approach may be used to train a model to generate thickness measurements with an error of less than 5% of the actual film thickness. Although thickness measurements can be extracted from a color image having three color channels, a hyperspectral camera may be added to the substrate imager system to provide higher dimensional feature input to the model. This may facilitate the training of a more complicated model to understand more physical properties of the film stack.

The deep learning in the metrology system may have high inference speed and still be able to achieve a high-resolution measurement of the thickness profile on the substrate. It enables the metrology system to be a fast and low-cost pre- and post-metrology measurement tool for memory applications with great thickness accuracy.

The details of one or more implementations are set forth in the accompanying drawings and the description below. Other aspects, features and advantages will be apparent from the description and drawings, and from the claims.

DESCRIPTION OF DRAWINGS

Like reference symbols in the various drawings indicate like elements.

DETAILED DESCRIPTION

Thin-film thickness measurements from dry metrology systems are used in CMP processing because of the variability in the polishing rate that occurs in CMP processes. Such dry metrology measurement techniques often use a spectrographic or ellipsometric approach in which variables in an optical model of a film stack are fit to the collected measurements. Such measurement techniques typically require precise alignment of a sensor to a measurement spot of the substrate to ensure that the model is applicable to the collected measurements. Therefore, measuring a large number of points on the substrate can be time-consuming, and collecting a high-resolution thickness profile is not feasible.

However, the usage of machine learning can enable measurement of a thickness of a film on a substrate with reduced time. By training a deep neural network using color images of dies from a substrate and associated thickness measurements by other reliable metrology systems, film thicknesses of dies can be measured by applying an input image to the neural network. This system can be used as a high throughput and economical solution, e.g., for low-cost memory applications. Aside from the thickness inferences, this technique can be used to classify levels of residue on the substrate using the image segmentation.

Figure 1:
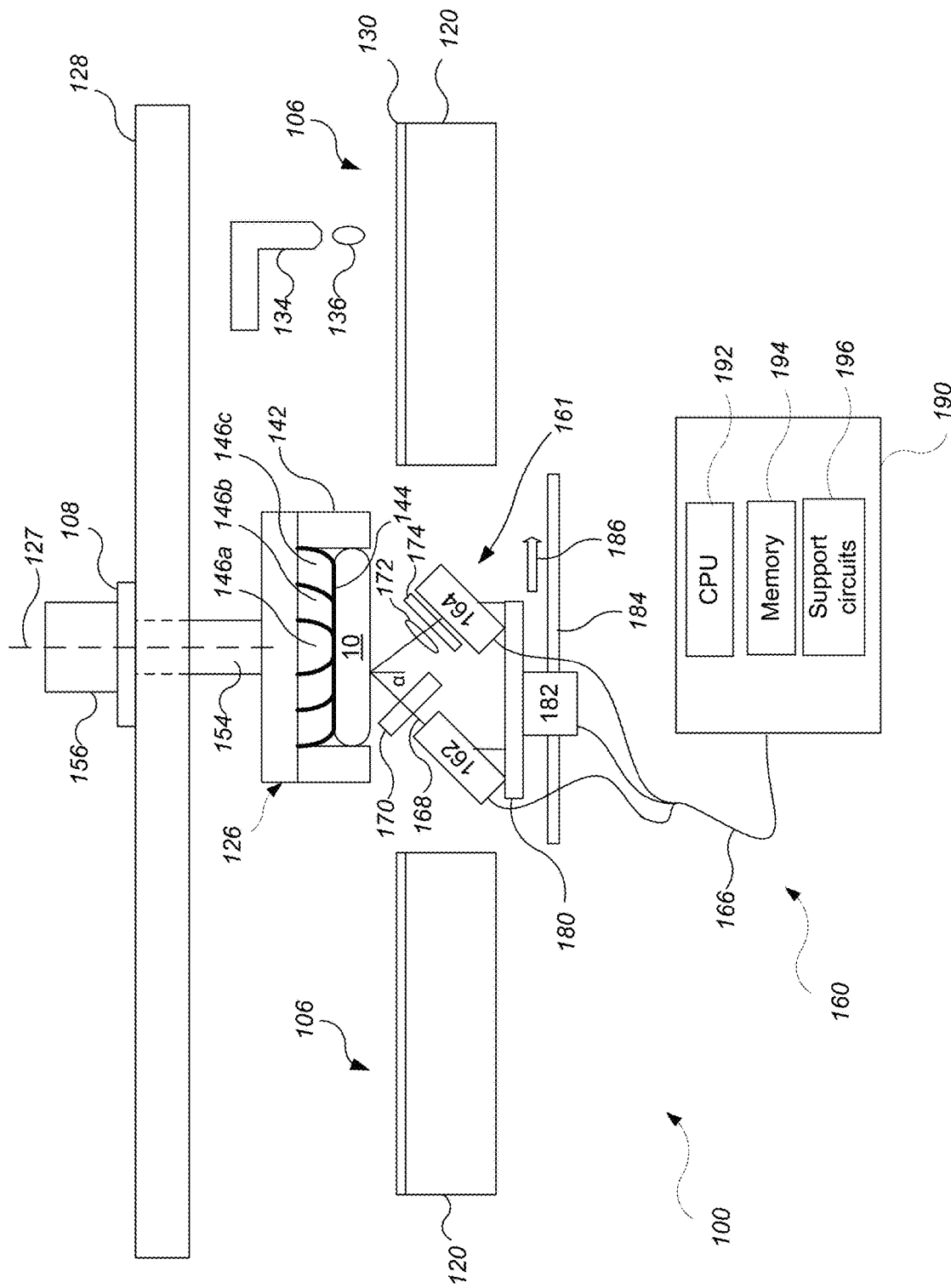
FIG. 1 illustrates a view of an example of an in-line optical measurement system.

Referring to FIG. 1, a polishing apparatus 100 includes one or more carrier heads 126, each of which is configured to carry a substrate 10, one or more polishing stations 106, and a transfer station to load substrate to and unload substrates from a carrier head. Each polishing station 106 includes a polishing pad 130 supported on a platen 120. The polishing pad 130 can be a two-layer polishing pad with an outer polishing layer and a softer backing layer.

The carrier heads 126 can be suspended from a support 128, and movable between the polishing stations. In some implementations, the support 128 is an overhead track and each carrier head 126 is coupled to a carriage 108 that is mounted to the track so that each carriage 108 can be selectively moved between the polishing stations 124 and the transfer station. Alternatively, in some implementations, the support 128 is a rotatable carousel, and rotation of the carousel moves the carrier heads 126 simultaneously along a circular path.

Each polishing station 106 of the polishing apparatus 100 can include a port, e.g., at the end of an arm 134, to dispense polishing liquid 136, such as abrasive slurry, onto the polishing pad 130. Each polishing station 106 of the polishing apparatus 100 can also include pad conditioning apparatus to abrade the polishing pad 130 to maintain the polishing pad 130 in a consistent abrasive state.

Each carrier head 126 is operable to hold a substrate 10 against the polishing pad 130. Each carrier head 126 can have independent control of the polishing parameters, for example, pressure associated with each respective substrate. In particular, each carrier head 126 can include a retaining ring 142 to retain the substrate 10 below a flexible membrane 144. Each carrier head 126 can also include a plurality of independently controllable pressurizable chambers defined by the membrane, e.g., three chambers 146a-146c, which can apply independently controllable pressures to associated zones on the flexible membrane 144 and thus on the substrate 10. Although only three chambers are illustrated in FIG. 1 for ease of illustration, there could be one or two chambers, or four or more chambers, e.g., five chambers.

Each carrier head 126 is suspended from the support 128 and is connected by a drive shaft 154 to a carrier head rotation motor 156 so that the carrier head can rotate about an axis 127. Optionally each carrier head 126 can oscillate laterally, e.g., by driving the carriage 108 on a track, or by the rotational oscillation of the carousel itself. In operation, the platen is rotated about its central axis, and each carrier head is rotated about its central axis 127 and translated laterally across the top surface of the polishing pad.

A controller 190, such as a programmable computer, is connected to each motor to independently control the rotation rate of the platen 120 and the carrier heads 126. The controller 190 can include a central processing unit (CPU) 192, a memory 194, and support circuits 196, e.g., input/output circuitry, power supplies, clock circuits, cache, and the like. The memory is connected to the CPU 192. The memory is a non-transitory computable readable medium, and can be one or more readily available memory such as random access memory (RAM), read-only memory (ROM), floppy disk, hard disk, or another form of digital storage. In addition, although illustrated as a single computer, the controller 190 could be a distributed system, e.g., including multiple independently operating processors and memories.

The polishing apparatus 100 also includes an in-line (also referred to as in-sequence) optical metrology system 160. A color imaging system of the in-line optical metrology system 160 is positioned within the polishing apparatus 100, but does not perform measurements during the polishing operation; rather measurements are collected between polishing operations, e.g., while the substrate is being moved from one polishing station to another, or pre- or post-polishing, e.g., while the substrate is being moved from the transfer station to a polishing station or vice versa. In addition, the in-line optical metrology system 160 can be positioned in a fab interface unit or a module accessible from the fab interface unit to measure a substrate after the substrate is extracted from a cassette but before the substrate is moved to the polishing unit, or after the substrate has been cleaned but before the substrate is returned to the cassette.

The in-line optical metrology system 160 includes a sensor assembly 161 that provides the color imaging of the substrate 10. The sensor assembly 161 can include a light source 162, a light detector 164, and circuitry 166 for sending and receiving signals between the controller 190 and the light source 162 and light detector 164.

The light source 162 can be operable to emit white light. In one implementation, the white light emitted includes light having wavelengths of 200-800 nanometers. A suitable light source is an array of white-light light-emitting diodes (LEDs), or a xenon lamp or a xenon mercury lamp. The light source 162 is oriented to direct light 168 onto the exposed surface of the substrate 10 at a non-zero angle of incidence $\alpha$. The angle of incidence $\alpha$ can be, for example, about 30° to 75°, e.g., 50°.

The light source can illuminate a substantially linear elongated region that spans the width of the substrate 10. For example, the light source 162 can include optics, e.g., a beam expander, to spread the light from the light source into an elongated region. Alternatively or in addition, the light source 162 can include a linear array of light sources. The light source 162 itself, and the region illuminated on the substrate, can elongate and have a longitudinal axis parallel to the surface of the substrate.

A diffuser 170 can be placed in the path of the light 168, or the light source 162 can include a diffuser, to diffuse the light before it reaches the substrate 10.

The detector 164 is a color camera that is sensitive to light from the light source 162. The camera includes an array of detector elements. For example, the camera can include a CCD array. In some implementations, the array is a single row of detector elements. For example, the camera can be a line-scan camera. The row of detector elements can extend parallel to the longitudinal axis of the elongated region illuminated by the light source 162. Where the light source 162 includes a row of light-emitting elements, the row of detector elements can extend along a first axis parallel to the longitudinal axis of the light source 162. A row of detector elements can include 1024 or more elements.

The camera 164 is configured with appropriate focusing optics 172 to project a field of view of the substrate onto the array of detector elements. The field of view can be long enough to view the entire width of the substrate 10, e.g., 150 to 300 mm long. The camera 164, including associated optics 172, can be configured such that individual pixels correspond to a region having a length equal to or less than about 0.5 mm. For example, assuming that the field of view is about 200 mm long and the detector 164 includes 1024 elements, then an image generated by the line-scan camera can have pixels with a length of about 0.5 mm. To determine the length resolution of the image, the length of the field of view (FOV) can be divided by the number of pixels onto which the FOV is imaged to arrive at a length resolution.

The camera 164 can be also be configured such that the pixel width is comparable to the pixel length. For example, an advantage of a line-scan camera is its very fast frame rate. The frame rate can be at least 5 kHz. The frame rate can be set at a frequency such that as the imaged area scans across the substrate 10, the pixel width is comparable to the pixel length, e.g., equal to or less than about 0.3 mm.

The light source 162 and the light detector 164 can be supported on a stage 180. Where the light detector 164 is a line-scan camera, the light source 162 and camera 164 are movable relative to the substrate 10 such that the imaged area can scan across the length of the substrate. In particular, the relative motion can be in a direction parallel to the surface of the substrate 10 and perpendicular to the row of detector elements of the line-scan camera 164.

In some implementations, the stage 182 is stationary, and the support for the substrate moves. For example, the carrier head 126 can move, e.g., either by motion of the carriage 108 or by rotational oscillation of the carousel, or the robot arm holding the substrate in a factory interface unit can move the substrate 10 past the line-scan camera 182. In some implementations, the stage 180 is movable while the carrier head or robot arm remains stationary for the image acquisition. For example, the stage 180 can be movable along a rail 184 by a linear actuator 182. In either case, this permits the light source 162 and camera 164 to stay in a fixed position relative to each other as the area being scanned moves across the substrate 10.

A possible advantage of having a line-scan camera and light source that move together across the substrate is that, e.g., as compared to a conventional 2D camera, the relative angle between the light source and the camera remains constant for different positions across the wafer. Consequently, artifacts caused by variation in the viewing angle can be reduced or eliminated. In addition, a line scan camera can eliminate perspective distortion, whereas a conventional 2D camera exhibits inherent perspective distortion, which then needs to be corrected by an image transformation.

The sensor assembly 161 can include a mechanism to adjust vertical distance between the substrate 10 and the light source 162 and detector 164. For example, the sensor assembly 161 can include an actuator to adjust the vertical position of the stage 180.

Optionally a polarizing filter 174 can be positioned in the path of the light, e.g., between the substrate 10 and the detector 164. The polarizing filter 174 can be a circular polarizer (CPL). A typical CPL is a combination of a linear polarizer and quarter-wave plate. Proper orientation of the polarizing axis of the polarizing filter 174 can reduce haze in the image and sharpen or enhance desirable visual features.

Assuming that the outermost layer on the substrate is a semitransparent layer, e.g., a dielectric layer, the color of light detected at detector 164 depends on, e.g., the composition of the substrate surface, substrate surface smoothness, and/or the amount of interference between light reflected from different interfaces of one or more layers (e.g., dielectric layers) on the substrate. As noted above, the light source 162 and light detector 164 can be connected to a computing device, e.g., the controller 190, operable to control their operation and receive their signals. The computing device that performs the various functions to convert the color image to a thickness measurement, can be considered part of the metrology system 160.

Figure 2A:
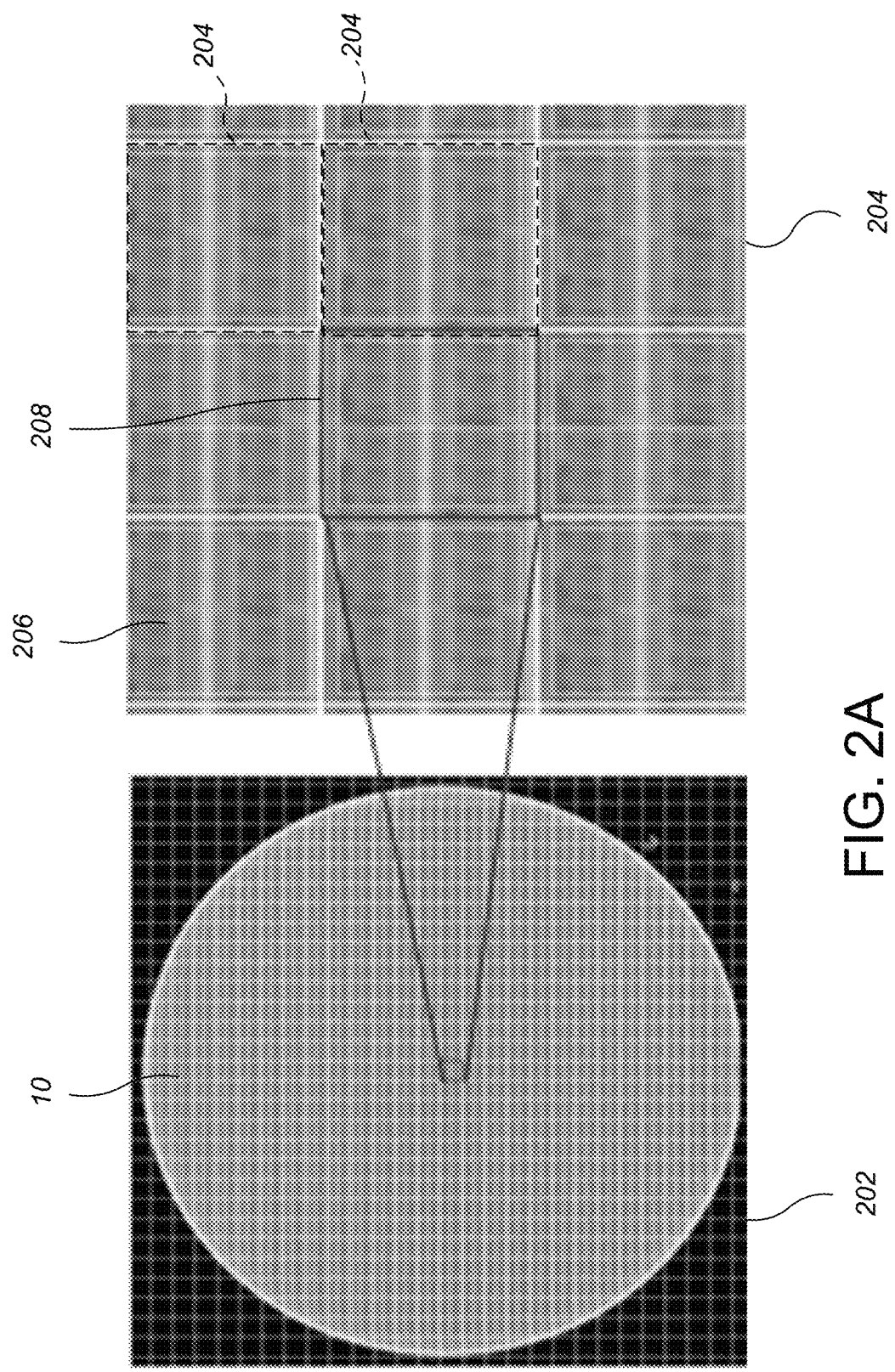
FIG. 2A illustrates an example of an exemplary image of a substrate used for model training.

Referring to FIG. 2A, an example of an image 202 of a substrate 10 collected with in-line optical metrology system 160 is shown. The in-line optical metrology system 160 produces a high-resolution color image 202, e.g., an image of at least 720×1080 pixels with at least three color channels, e.g., RGB channels), e.g., an image of at least 2048×2048 pixels. The color at any particular pixel depends on the thickness of one or more layers, including the top layer, in the area of the substrate corresponding to the pixel.

The image 202 is divided into one or more regions 208, each region corresponding to a die 206 being fabricated on the substrate. The portion of the image that provides a region 208 can be a predetermined area in the image, or the portion that provides a region 208 can be determined automatically by an algorithm based on the image.

As an example of a predetermined area in the image, the controller 190 can store a die mask that identifies a location and area in the image for each region 208. For example, for rectangular regions, the area can be defined by upper right and lower left coordinates in the image. Thus, the mask could be a data file that includes a pair of an upper right and a lower left coordinate for each rectangular region. In other cases, where regions are non-rectangular, more complex functions can be used.

In some implementations, the orientation and position of the substrate can be determined, and the die mask can be aligned with respect to the image. The substrate orientation can be determined by a notch finder, or by image processing of the color image 202, e.g., to determine the angle of scribe lines in the image. The substrate position can also be determined by image processing of the color image 202, e.g., by detecting the circular substrate edge and then determining a center of the circle.

As an example determining the region 208 automatically, an image processing algorithm can analyze the image 202 and detects scribe lines. The image 202 can then be divided into regions between the identified scribe lines.

By dividing the initial color image, a plurality of color images 204 of individual regions 208 can be collected from the substrate 10. As noted above, each color image 204 corresponds to a die 206 being fabricated on the substrate. The color images collected can be exported as PNG images, although many other formats, e.g., JPEG, etc., are possible.

A color images 204 can be fed to an image processing algorithm to generate a thickness measurement for the die shown in the color image 204. The image is used as input data to an image processing algorithm that has been trained, e.g., by a supervised deep learning approach, to estimate a layer thickness based on a color image. The supervised deep learning-based algorithm establishes a model between color images and thickness measurements. The image processing algorithm can include a neural network as the deep learning-based algorithm.

The intensity value for each color channel of each pixel of the color image 204 is entered into the image processing algorithm, e.g., into the input neurons of the neural network. Based on this input data, a layer thickness measurement are calculated for the color image. Thus, input of the color image 204 to the image processing algorithm result in output of an estimated thickness. This system can be used as high-throughput and economical solution, e.g., for the low-cost memory applications. Aside from the thickness inferences, this technique can be used to classify levels of residue on the substrate using the image segmentation.

In order to train the image processing algorithm, e.g., the neural network, using the supervised deep learning approach, calibration images of dies from one or more calibration substrates can be obtained as discussed above. That is, each calibration substrate can be scanned by the line-scan camera of the in-line optical metrology system 160 to generate an initial calibration image, and the initial calibration image can be divided into a plurality of color images of the individual regions on the calibration substrate.

Either before or after the initial color calibration image is collected, ground truth thickness measurements are collected at multiple locations on the calibration substrate using a high-accuracy metrology system, e.g., an in-line or stand-alone metrology system. The high-accuracy metrology system can be a dry optical metrology system. The ground truth measurement can come from offline reflectometry, ellipsometry, scatterometry or more advanced TEM measurements, although other techniques may be suitable. Such systems are available from Nova Measuring Instruments Inc. or Nanometrics, Inc. Each location corresponds to one of the dies being fabricated, i.e., to one of the individual regions.

Figure 2B:
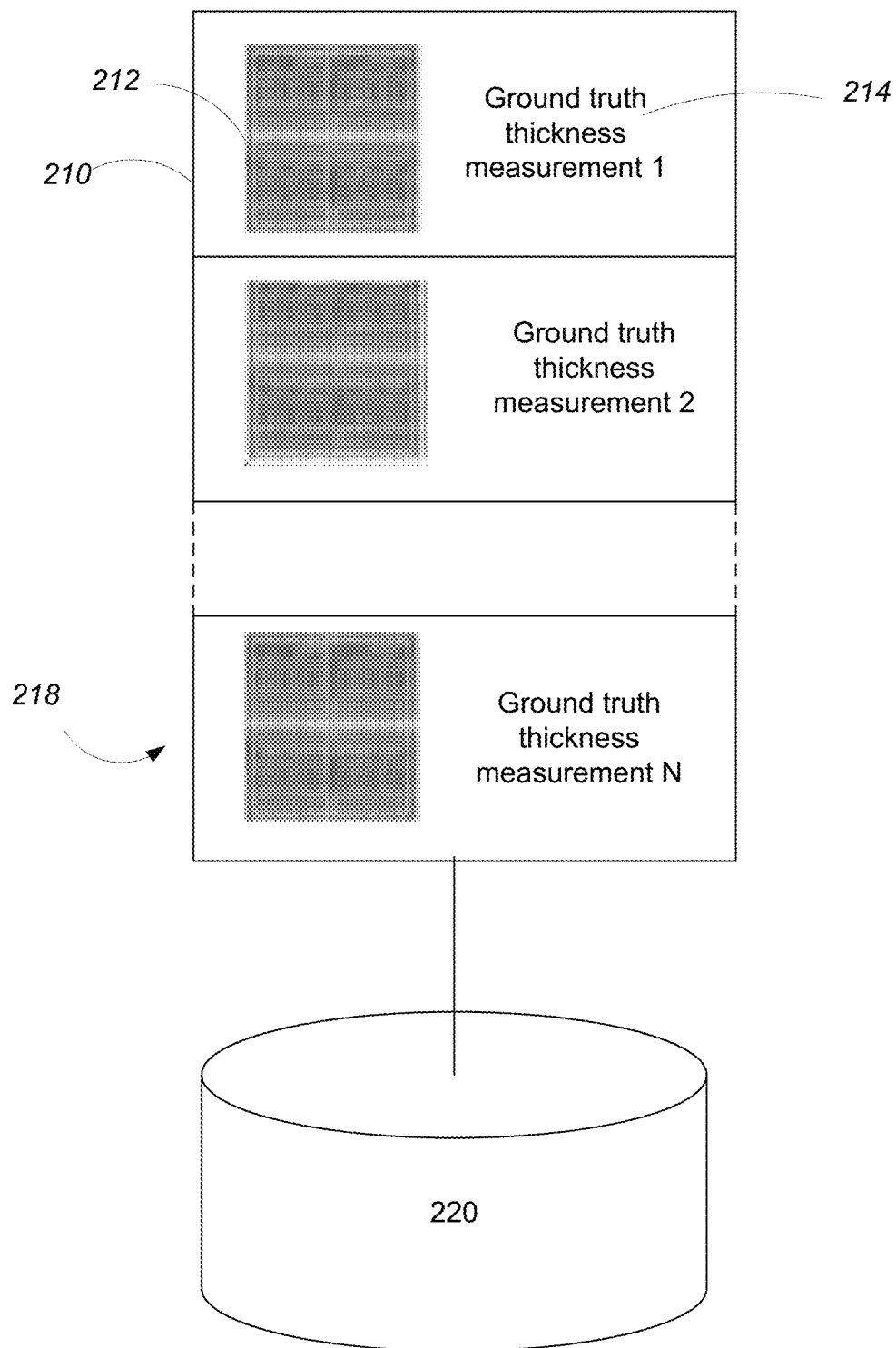
FIG. 2B is a schematic illustration of a computer data storage system.

For example, referring to FIG. 2B, for each individual region on each calibration substrate, a color calibration image 212 is collected with the in-line sensor of the optical metrology system 160. Each color calibration image is associated with the ground truth thickness measurement 214 for the corresponding die on the calibration substrate. The images 212 and associated ground truth thickness measurements 214 can be stored in a database 220. For example, the data can be stored as records 210 with each record including a calibration image 212 and a ground truth thickness measurement 214.

The deep learning-based algorithm, e.g., the neural network, is then train using the combined data set 218. The thickness measurements corresponding to the center of die measured from dry metrology tool is used as a label for the input image while training the model. For example, the model may be trained on about 50,000 images collected from five dies on a substrate that have a wide range of post thicknesses.

Figure 3:
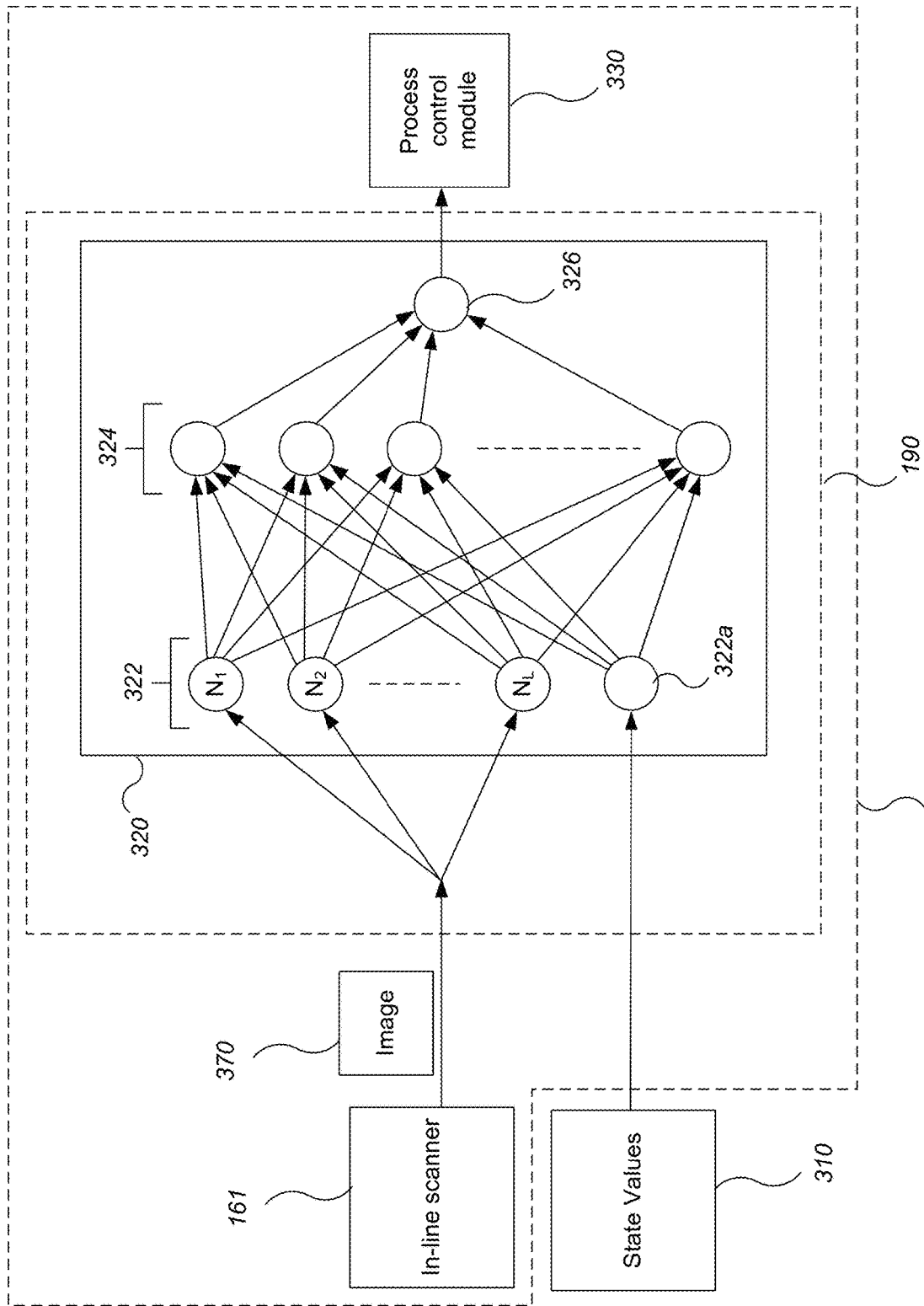
FIG. 3 illustrates a neural network used as a part of the controller for the polishing apparatus.

FIG. 3 illustrates a neural network 320 used as a part of the controller 190 for the polishing apparatus 100. The neural network 320 can be a deep neural network developed for regression analysis of RGB intensity values of the input images from the calibration substrate and the ground truth thickness measurements to generate a model to predict the layer thickness of a region of a substrate based on a color image of that region.

The neural network 320 includes a plurality of input nodes 322. The neural network 320 can include an input node for each color channel associated with each pixel of the input color image, a plurality of hidden nodes 324 (also called "intermediate nodes" below), and an output node 326 that will generate the layer thickness measurement value. In a neural network having a single layer of hidden nodes, each hidden node 324 can be coupled to each input node 322, and the output node 326 can be coupled to each hidden node 320. However, as a practical matter, the neural network for image processing is likely to have many layers of hidden nodes 324.

In general, a hidden node 324 outputs a value that a non-linear function of a weighted sum of the values from the input nodes 322 or prior layers of hidden nodes to which the hidden node 324 is connected.

For example, the output of a hidden node 324 in the first layer, designated node k, can be expressed as:

$$\tanh(0.5*a_{k1}(I_1)+a_{k2}(I_2)+ \ldots +a_{kM}(I_M)+b_k)$$

where tanh is the hyperbolic tangent, $a_{kx}$ is a weight for the connection between the $k^{th}$ intermediate node and the $x^{th}$ input node (out of M input nodes), and $I_M$ is the value at the $M^{th}$ input node. However, other non-linear functions can be used instead of tanh, such as a rectified linear unit (ReLU) function and its variants.

The neural network 320 thus includes an input node 322 for each color channel associated with each pixel of the input color image, e.g., where there are J pixels and K color channels, then L=J*K is number of intensity values in an input color image, and the neural network 320 will include at least input nodes $N_1, N_2 \ldots N_L$.

Thus, where the number of input nodes corresponds to the number of intensity values in the color image, the output $H_k$ of a hidden node 324, designated node k, can be expressed as:

$$H_k=\tanh(0.5*a_{k1}(I_1)+a_{k2}(I_2)+ \ldots +a_{kL}(I_L)+b_k)$$

Assuming that the measured color image S is represented by a column matrix $(i_1, i_2, \ldots, i_L)$, the output of an intermediate node 324, designated node k, can be expressed as:

$$H_k=\tanh(0.5*a_{k1}(V_1 \cdot S)+a_{k2}(V_2 \cdot S)+ \ldots +a_{kL}(V_L \cdot S)+b_k)$$

where V is a value $(v_1, v_2, \ldots, v_L)$ of weights, with $V_x$ being the weight for the $x^{th}$ intensity value out of L intensity values from the color image).

The output node 326 can generate a characteristic value CV, e.g., thickness, that is a weighted sum of the outputs of the hidden nodes. For example, this can be expressed as $$CV=C_1*H_1+C_2*H_2+ \ldots +C_L*H_L$$

where $C_k$ is the weight for the output of the $k^{th}$ hidden node.

However, neural network 320 may optionally include one or more other input nodes, e.g., node 322a, to receive other data. This other data could be from a prior measurement of the substrate by the in-situ monitoring system, e.g., pixel intensity values collected from earlier in the processing of the substrate, from a measurement of a prior substrate, e.g., pixel intensity values collected during processing of another substrate, from another sensor in the polishing system, e.g., a measurement of a temperature of the pad or substrate by a temperature sensor, from a polishing recipe stored by the controller that is used to control the polishing system, e.g., a polishing parameter such as carrier head pressure or platen rotation rate use for polishing the substrate, from a variable tracked by the controller, e.g., a number of substrates since the pad was changed, or from a sensor that is not part of the polishing system, e.g., a measurement of a thickness of underlying films by a metrology station. This permits the neural network 320 to take into account other processing or environmental variables in the calculation of the layer thickness measurement value.

The thickness measurement generated at the output node 326 is fed to a process control module 330. The process control module can adjust, based on the thickness measurements of one or more regions, the process parameters, e.g., carrier head pressure, platen rotation rate, etc. The adjustment can be performed for a polishing process to be performed on the substrate or a subsequent substrate.

Before being used for, e.g., substrate measurements, the neural network 320 needs to be configured.

As part of a configuration procedure, the controller 190 can receive a plurality of calibration images. Each calibration image has multiple intensity values, e.g., an intensity value for each color channel, for each pixel of the calibration image. The controller also receives a characterizing value, e.g., thickness, for each calibration image. For example, the color calibration image can be measured at a particular die being fabricated on one or more calibration or test substrates. In addition, ground truth measurements of the thickness at the particular die locations can be performed with dry metrology equipment, e.g., a contact profilometer or ellipsometer. A ground truth thickness measurement can thus be associated with the color image from the same die location on a substrate. The plurality of color calibration images can be generated from, for example, five to ten calibration substrates, by dividing images of the calibration substrates as discussed above. As of the configuration procedure for the neural network 320, the neural network 320 is trained using the color image and the characteristic value for each die fabricated on a calibration substrate.

V corresponds to one of the color images and is thus associated with a characteristic value. While the neural network 320 is operating in a training mode, such as a backpropagation mode, the values $(v_1, v_2, \ldots, v_L)$ are fed to the respective input nodes $N_1, N_2 \ldots N_L$ while the characteristic value CV is fed to the output node 326. This can be repeated for each row. This process sets the values for $a_{k1}$, etc., in Equations 1 or 2 above.

The system is now ready for operation. A color image measured from a substrate using the in-line monitoring system 160. The measured color image can be represented by a column matrix $S=(i_1, i_2, \ldots, i_L)$, where $i_j$ represents the intensity value at the jth intensity value out of L intensity values, with L=3n when the image includes a total of n pixels and each pixel includes three color channels.

While the neural network 320 is used in an inference mode, these values $(S_1, S_2, \ldots, S_L)$ are fed as inputs to the respective input nodes $N_1, N_2, \ldots N_L$. As a result, the neural network 320 generates a characteristic value, e.g., a layer thickness, at the output node 326.

The architecture of the neural network 320 can vary in depth and width. For example, although the neural network 320 is shown with a single column of intermediate nodes 324, it could include multiple columns. The number of intermediate nodes 324 can be equal to or greater than the number of input nodes 322.

As noted above, the controller 190 can associate the various color images with different dies (see FIG. 2) on the substrate. The output of each neural network 320 can be classified as belonging to one of the dies based on the position of the sensor on the substrate at the time the image is collected. This permits the controller 190 to generate a separate sequence of measurement values for each die.

In some implementations, the controller 190 can be configured to have a neural network model structure with composed of multiple different types of building blocks. For example, the neural network be a residual neural network that includes a res-block feature in its architecture. A residual neural network may utilizing skip connections, or shortcuts, to jump over some layers. A residual neural network can be implemented. e.g., with a ResNet model. In the context of residual neural networks, a non-residual network may be described as a plain network.

In some implementations, a neural network may be trained to take the underlying layer thickness from the stack into consideration during calculations, which can improve errors due to underlying variation in thickness measurements. The effect of the underlying thickness variation in the film stack can be alleviated by feeding the intensity values of the color images of the thicknesses of the underlying layers as extra inputs to the model to improve the performance of the model.

The reliability of the computed thickness measurements can be evaluated by comparing them to the measured values and then determining a difference between the computed values and the original measured values. This deep learning model may then be used for predicting the thickness in the inference mode, immediately after a new test substrate is scanned. This new approach enhances the throughput of the entire system and enables the thickness measurement to be performed on all substrates in the lot.

Figure 4:
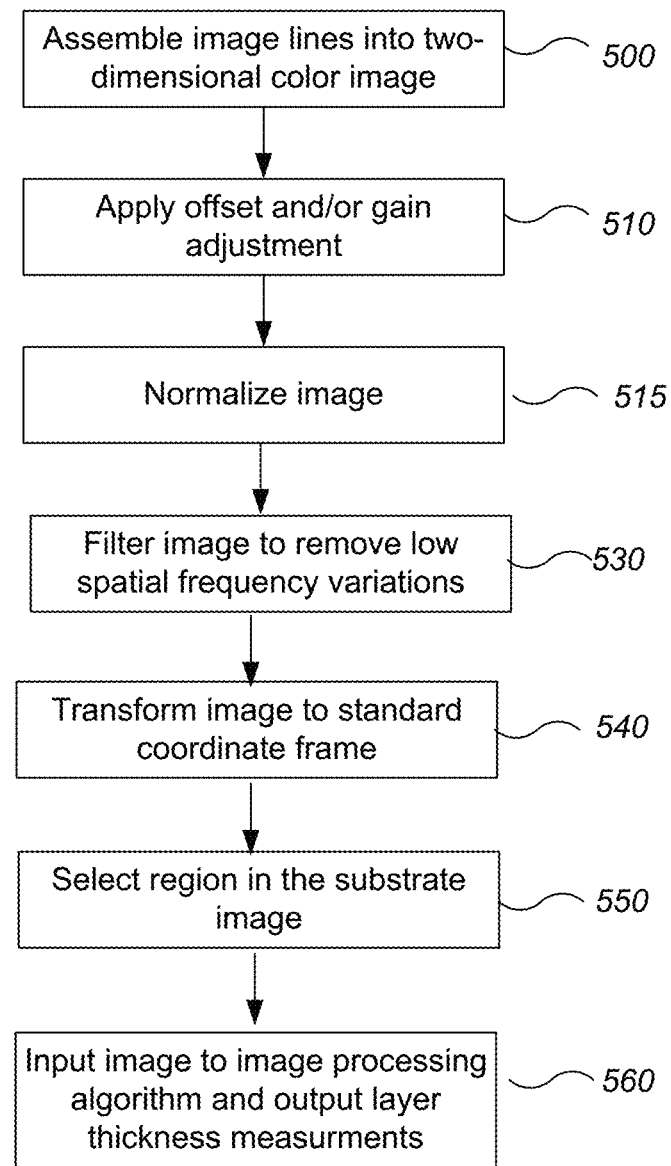
FIG. 4 illustrates a flow chart for a method of detecting a thickness of a layer on a substrate using a deep learning approach.

Referring to FIG. 4, a method of an image processing algorithm generated by machine learning techniques for use in a substrate thickness measurement system. Such an image processing algorithm can receive RGB images collected from an integrated line-scan camera inspection system and enables film thickness estimates with much faster speed. The inference time for about 2000 measurement points is about a few seconds, as compared to 2 hours with dry metrology.

The method includes the controller assembling individual image lines from the light detector 164 into a two-dimensional color image (500). The controller can apply an offset and/or a gain adjustment to the intensity values of the image in each color channel (510). Each color channel can have a different offset and/or gain. Optionally, the image can be normalized (515). For example, the difference between the measured image and a standard predefined image can be calculated. For example, the controller can store a background image for each of the red, green, and blue color channels, and the background image can be subtracted from the measured image for each color channel. Alternatively, the measured image can be divided by the standard predefined image. The image can be filtered to remove low-frequency spatial variations (530). In some implementations, a luminance channel is used to generate the filter, which is then applied to the red, green, and blue images.

The image is transformed, e.g., scaled and/or rotated and/or translated, into a standard image coordinate frame (540). For example, the image can be translated so that the die center is at the center point of the image and/or the image can be scaled so that the edge of the substrate is at the edge of the image, and/or the image can be rotated so that there is a 0° angle between the x-axis of the image and the radial segment connecting the substrate center and the substrate orientation feature.

One or more regions on the substrate are selected and an image is generated for each selected region (550). This can be performed using the techniques described above, e.g., the regions can be predetermined areas, or the portion that provides a region 208 can be determined automatically by an algorithm The intensity values provided by each color channel for each pixel of the image is considered used as input to the supervised deep learning-trained image processing algorithm. The image processing algorithm outputs a layer thickness measurement for the particular region (560).

Various deep model architectures were trained and validated on small die test patterned substrates with a goal of reducing errors in the measurements. The model that took into consideration the characteristics of the underlying layer had a lower error. In addition, preliminary tool-to-tool matching validation was performed by training the model with data collected on one tool and using it for inferences on the data from other tools. Results were comparable to training and inferencing with data from the same tool.

In general, data can be used to control one or more operation parameters of the CMP apparatus. Operational parameters include, for example, platen rotational velocity, substrate rotational velocity, the polishing path of the substrate, the substrate speed across the plate, the pressure exerted on the substrate, slurry composition, slurry flow rate, and temperature at the substrate surface. Operational parameters can be controlled real-time and can be automatically adjusted without the need for further human intervention.

As used in the instant specification, the term substrate can include, for example, a product substrate (e.g., which includes multiple memory or processor dies), a test substrate, a bare substrate, and a gating substrate. The substrate can be at various stages of integrated circuit fabrication, e.g., the substrate can be a bare wafer, or it can include one or more deposited and/or patterned layers. The term substrate can include circular disks and rectangular sheets.

However, the color image processing technique described above can be particularly useful in the context of 3D vertical NAND (VNAND) flash memory. In particular, the layer stack used in fabrication of VNAND is so complicated that current metrology methods (e.g., Nova spectrum analysis) may be unable to perform with sufficient reliability in detecting regions of improper thickness. In contrast, the color image processing technique can have superior reliability in this application.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in a non-transitory machine readable storage media, for execution by, or to control the operation of, data processing apparatus, e.g., a programmable processor, a computer, or multiple processors or computers.

Terms of relative positioning are used to denote positioning of components of the system relative to each other, not necessarily with respect to gravity; it should be understood that the polishing surface and substrate can be held in a vertical orientation or some other orientations.

A number of implementations have been described. Nevertheless, it will be understood that various modifications may be made. For example Rather than a line scan camera, a camera that images the entire substrate could be used. In this case, motion of the camera relative to the substrate is not needed.

The camera could cover less than the entire width of the substrate. In this case, the camera would need to undergo motion in two perpendicular directions, e.g., be supported on an X-Y stage, in order to scan the entire substrate.

The light source could illuminate the entire substrate. In this case, the light source need not move relative to the substrate.

The light detector can be a spectrometer rather than a color camera; the spectra data can then be reduced to the RGB color space.

The sensory assembly need not an in-line system positioned between polishing stations or between a polishing station and a transfer station. For example, the sensor assembly could be positioned within the transfer station, positioned in a cassette interface unit, or be a stand-alone system.

The uniformity analysis step is optional. For example, the image generated by applying the threshold transformation can be fed into a feed-forward process to adjust a later processing step for the substrate, or into a feedback process to adjust the processing step for a subsequent substrate.

Accordingly, other implementations are within the scope of the claims.

What is claimed is:

1. A method of training a neural network for use in a substrate thickness measurement system, comprising:
   obtaining ground truth thickness measurements of a top layer of a calibration substrate at a plurality of locations, each location at a defined position for a die being fabricated on the substrate;
   obtaining a plurality of color images of the calibration substrate, each color image corresponding to a region for a die being fabricated on the substrate; and
   training a neural network to convert color images of die regions from an in-line substrate imager to thickness measurements for the top layer in the die region, the training performed using training data that includes the plurality of color images and ground truth thickness measurements with each respective color image paired with a ground truth thickness measurement for the die region associated with the respective color image.

2. The method of claim 1, wherein obtaining the plurality of color images includes scanning the calibration substrate with the in-line substrate imager.

3. The method of claim 1, wherein obtaining the plurality of color images includes receiving a color image of the calibration substrate, and dividing the color image into the plurality of color images based on a die mask.

4. The method of claim 1, comprising obtaining ground truth thickness measurements of top layers of a plurality of calibration substrates, and obtaining a plurality of color images for each of the calibration substrates.

5. The method of claim 1, wherein obtaining the ground truth thickness measurements comprises measuring a thickness at each of the plurality of locations using an optical profilometer.

6. The method of claim 1, comprising
   obtaining ground truth thickness measurements of an underlying layer of the calibration substrate at the plurality of locations;
   training the neural network to convert color images of die regions from the in-line substrate imager to thickness measurements of the underlying layer.

7. The method of claim 1, wherein the defined position is a center of the die.

8. The method of claim 1, comprising normalizing each color image of the plurality of color images by calculating a difference between the color image and a predefined image.

9. The method of claim 1, wherein the method measures all dies in a substrate.

10. The method of claim 1, wherein the method measures all substrates in a lot at both pre and post chemical mechanical planarization.

11. A non-transitory computer readable medium encoded with a computer program product comprising instructions to cause one or more processors to:
obtain ground truth thickness measurements of a top layer of a calibration substrate at a plurality of locations, each location at a defined position for a die being fabricated on the substrate;
obtain a plurality of color images of the calibration substrate, each color image corresponding to a region for a die being fabricated on the substrate; and
train a neural network to convert color images of die regions from an in-line substrate imager to thickness measurements for the top layer in the die region, wherein the instructions to train the neural network include instructions to use use training data that includes the plurality of color images and ground truth thickness measurements with each respective color image paired with a ground truth thickness measurement for the die region associated with the respective color image.

12. The computer readable medium of claim 11, wherein the instructions to obtain the plurality of color images include instructions to receive a scan of the calibration substrate from the in-line substrate imager.

13. The computer readable medium of claim 11, wherein the instructions to obtain the plurality of color images include instructions to receive a color image of the calibration substrate, and to divide the color image into the plurality of color images based on a die mask.

14. The computer readable medium of claim 11, comprising instructions to obtain ground truth thickness measurements of top layers of a plurality of calibration substrates, and obtain a plurality of color images for each of the calibration substrates.

15. The computer readable medium of claim 11, wherein the instructions to obtain the ground truth thickness measurements comprise instructions to receive a measurement of a thickness at each of the plurality of locations from an optical profilometer.

16. The computer readable medium of claim 11, comprising instructions to
obtain ground truth thickness measurements of an underlying layer of the calibration substrate at the plurality of locations;
train the neural network to convert color images of die regions from the in-line substrate imager to thickness measurements of the underlying layer.

17. The computer readable medium of claim 11, wherein the defined position is a center of the die.

18. The computer readable medium of claim 11, comprising instructions to normaliz each color image of the plurality of color images by calculating a difference between the color image and a predefined image.

19. The computer readable medium of claim 11, comprising instructions to measure all dies in a substrate.

20. The computer readable medium of claim 11, comprising instructions to measure all substrates in a lot at both pre and post chemical mechanical planarization.

* * * * *

UNITED STATES PATENT AND TRADEMARK OFFICE
CERTIFICATE OF CORRECTION

PATENT NO. : 11,836,913 B2
APPLICATION NO. : 17/359307
DATED : December 5, 2023
INVENTOR(S) : Sivakumar Dhandapani et al.

It is certified that error appears in the above-identified patent and that said Letters Patent is hereby corrected as shown below:

In the Claims

In Claim 11, Column 13, Line 18, delete "use use" and insert -- use --.

In Claim 18, Column 14, Line 23, delete "normaliz" and insert -- normalize --.

Signed and Sealed this
Thirteenth Day of February, 2024

Katherine Kelly Vidal
*Director of the United States Patent and Trademark Office*